United States Patent
Zancanato et al.

(10) Patent No.: US 11,186,244 B2
(45) Date of Patent: Nov. 30, 2021

(54) SMART CHILD SAFETY EQUIPMENT IN VEHICLES

(71) Applicant: STMICROELECTRONICS S.r.l, Agrate Brianza (IT)

(72) Inventors: Alberto Zancanato, Milan (IT); Michele Ferraina, Milan (IT); Matteo Dameno, Novara (IT); Mario Tesi, Cornaredo (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/362,116

(22) Filed: Mar. 22, 2019

(65) Prior Publication Data
US 2020/0298782 A1 Sep. 24, 2020

(51) Int. Cl.
| | |
|---|---|
| B60R 21/015 | (2006.01) |
| B60N 2/00 | (2006.01) |
| B60N 2/26 | (2006.01) |
| B60R 25/32 | (2013.01) |
| B60R 25/34 | (2013.01) |

(52) U.S. Cl.
CPC ........ B60R 21/01556 (2014.10); B60N 2/002 (2013.01); B60N 2/26 (2013.01); B60R 25/32 (2013.01); B60R 25/34 (2013.01)

(58) Field of Classification Search
CPC ... B60R 21/01556; B60R 25/32; B60R 25/34; B60N 2/002; B60N 2/26
See application file for complete search history.

(56) References Cited

U.S. PATENT DOCUMENTS

| | | | | |
|---|---|---|---|---|
| 5,072,965 A | * | 12/1991 | Wada | B60G 17/017 280/5.515 |
| 5,293,095 A | * | 3/1994 | Tamura | G08B 13/1681 310/338 |
| 5,322,323 A | * | 6/1994 | Ohno | B60R 21/0132 180/286 |
| 6,127,921 A | * | 10/2000 | Gullner | B60R 25/1004 340/426.26 |
| 6,408,233 B1 | * | 6/2002 | Solomon | G01C 21/26 340/991 |
| 6,922,147 B1 | * | 7/2005 | Viksnins | B60N 2/002 340/573.1 |

(Continued)

FOREIGN PATENT DOCUMENTS

WO 2012/109472 A2 8/2012

OTHER PUBLICATIONS

Evenflo "Award-Winning SensorSafe Technology—When a simple reminder can save a life, it just makes sense," downloaded on Apr. 19, 2019, from http://www.evenflo.com/sensorsafe/sensorsafe.html, 4 pages.

*Primary Examiner* — Nay Tun
(74) *Attorney, Agent, or Firm* — Seed IP Law Group LLP (57) ABSTRACT

A child safety seat may include a motion sensor, e.g., an accelerometer, and a pressure sensor, e.g., a air pressure sensor. The motion sensor is configured to detect a motion state of a vehicle where the child safety seat is installed, e.g., whether the vehicle is moving or non-moving. The pressure sensor is configured to detect a motion state of a door of the vehicle, e.g., a door open/close motion. Based on the information detected by the motion sensor and the pressure sensor, a controller determines whether an awareness scenario occurs.

19 Claims, 7 Drawing Sheets

(56) References Cited

U.S. PATENT DOCUMENTS

| | | | |
|---|---|---|---|
| 7,106,207 B1 | 9/2006 | Marchan | |
| 7,218,218 B1* | 5/2007 | Rogers | B60N 2/002 |
| | | | 340/425.5 |
| 9,014,920 B1* | 4/2015 | Torres | G08B 21/0202 |
| | | | 701/45 |
| 9,302,618 B2* | 4/2016 | Shaw | B60N 2/26 |
| 9,511,730 B1* | 12/2016 | Wu | B60W 50/14 |
| 9,725,038 B2* | 8/2017 | Wu | B60Q 1/323 |
| 9,845,050 B1* | 12/2017 | Garza | G08B 21/0205 |
| 9,965,940 B1* | 5/2018 | Voss | G08B 21/22 |
| 9,998,899 B1* | 6/2018 | Tannenbaum | H04W 4/90 |
| 10,102,729 B1* | 10/2018 | Hill | G08B 21/24 |
| 10,343,601 B2* | 7/2019 | Wu | B60Q 3/80 |
| 2002/0157883 A1* | 10/2002 | Ogata | F02N 11/0833 |
| | | | 180/65.245 |
| 2003/0122662 A1 | 7/2003 | Quinonez | |
| 2006/0103516 A1 | 5/2006 | Zang | |
| 2006/0208911 A1* | 9/2006 | Davis | B60N 2/002 |
| | | | 340/573.4 |
| 2006/0255911 A1* | 11/2006 | Taki | B60R 25/24 |
| | | | 340/5.72 |
| 2008/0012696 A1* | 1/2008 | Segura Gordillo | |
| | | | G07C 9/00174 |
| | | | 340/435 |
| 2009/0064742 A1* | 3/2009 | Murakami | B60R 25/02153 |
| | | | 70/252 |
| 2009/0212955 A1* | 8/2009 | Schoenberg | B60N 2/002 |
| | | | 340/573.1 |
| 2009/0237229 A1 | 9/2009 | Kautz | |
| 2011/0241855 A1* | 10/2011 | Weaver | B60R 16/0237 |
| | | | 340/426.25 |
| 2012/0022382 A1* | 1/2012 | Daisuke | A61B 5/002 |
| | | | 600/481 |
| 2012/0123633 A1* | 5/2012 | Uyeki | B60L 58/12 |
| | | | 701/33.2 |
| 2012/0232749 A1* | 9/2012 | Schoenberg | B60N 2/002 |
| | | | 701/36 |
| 2012/0268265 A1* | 10/2012 | Morley | B60N 2/28 |
| | | | 340/457 |
| 2013/0009766 A1* | 1/2013 | Shaw | B60N 2/26 |
| | | | 340/457 |
| 2013/0109342 A1* | 5/2013 | Welch | B60N 2/002 |
| | | | 455/404.2 |
| 2013/0154792 A1* | 6/2013 | Reed | E05F 15/43 |
| | | | 340/3.1 |
| 2014/0098230 A1* | 4/2014 | Baur | B60Q 9/008 |
| | | | 348/148 |
| 2014/0167954 A1* | 6/2014 | Johnson | H04W 76/10 |
| | | | 340/539.11 |
| 2014/0217816 A1* | 8/2014 | Okada | H02J 7/00034 |
| | | | 307/10.1 |
| 2015/0015198 A1* | 1/2015 | Okada | H02J 7/025 |
| | | | 320/108 |
| 2015/0100203 A1* | 4/2015 | Tai | B60Q 3/85 |
| | | | 701/36 |
| 2015/0332578 A1 | 11/2015 | Borgne et al. | |
| 2016/0003698 A1* | 1/2016 | Wiesbauer | G01L 13/025 |
| | | | 381/174 |
| 2016/0171859 A1* | 6/2016 | Bowlus | G08B 21/02 |
| | | | 340/457 |
| 2016/0297324 A1* | 10/2016 | Taylor | B60N 2/002 |
| 2017/0240111 A1 | 8/2017 | Appukutty et al. | |
| 2017/0282791 A1* | 10/2017 | Voorhies | B60N 2/90 |
| 2017/0297577 A1* | 10/2017 | Tsuji | B60W 10/182 |
| 2018/0072285 A1* | 3/2018 | Tanaka | B60T 13/74 |
| 2018/0111597 A1* | 4/2018 | May | B60W 50/0097 |
| 2018/0233045 A1* | 8/2018 | Kumar | G08G 1/127 |
| 2018/0338229 A1* | 11/2018 | Nemec | G06Q 50/30 |
| 2019/0133511 A1* | 5/2019 | Migneco | B60N 2/24 |
| 2019/0283669 A1* | 9/2019 | Jiang | B60Q 3/80 |

* cited by examiner

SMART CHILD SAFETY EQUIPMENT IN VEHICLES

BACKGROUND

Technical Field

The present disclosure relates generally to sensors integrated in a smart device, and more particularly, to smart child safety devices having sensors.

Description of the Related Art

Currently, mobile phones and wearable electronic devices are equipped with fast processors capable of performing complex computation locally or in coordination with a cloud based server. The mobile device may also include multiple micro-electromechanical sensors (MEMS) that can enable the determination of various types of contextual information of the device's user. Some of the sensors useful for obtaining contextual information are accelerometers, air pressure sensors, gyroscopes, magnetometers and microphones.

In the field of child safety devices, such as child safety seats used in a vehicle, the effectiveness of such safety devices is compromised or even contradicted by human errors. For example, there have been accidents in which children died in locked cars exposed to sunshine. Human errors caused such fatal accidents. Various approaches have been proposed to improve the awareness of the human errors such that serious fatal accidents can be avoided. Existing solutions require installation of additional components directly integrated into the electrical or signal system of the vehicles, which are inconvenient, difficult to use and are costly.

BRIEF SUMMARY

The present disclosure is directed to techniques for determining an awareness scenario related to a child safety device using smart sensors separately from the vehicle. In an embodiment, a child safety seat may include a motion sensor, e.g., an accelerometer, and a pressure sensor, e.g., an air pressure sensor. The motion sensor is configured to detect a motion state of a vehicle where the child safety seat is installed, e.g., whether the vehicle is moving or non-moving. The pressure sensor is configured to detect a motion state of a door of the vehicle, e.g., a door open/close motion. Based on the information detected by the motion sensor and the pressure sensor, a controller determines whether an awareness scenario occurs. For example, if the motion sensor detects that the vehicle is in a non-moving state and the pressure sensor detects that a door is opened and closed, the controller may determine that a driver has left the vehicle. If the controller also determines that a child is still in the child safety seat, either through sensing or through human inputs, the controller will generate a control event, e.g., by initiating an alarm, which reminds a user of the awareness scenario, e.g., a child is left in the unattended vehicle.

BRIEF DESCRIPTION OF THE SEVERAL VIEWS OF THE DRAWINGS

The present disclosure will be more fully understood by reference to the following figures, which are for illustrative purposes only. The figures are not necessarily drawn to scale, and elements of similar structures or functions are generally represented by like reference numerals for illustrative purposes throughout the figures. The figures do not describe every aspect of the teachings disclosed herein, and do not limit the scope of the claims.

DETAILED DESCRIPTION

The present disclosure is directed to techniques for determining an awareness scenario related to a child safety device using smart sensors separately from the vehicle. A smart sensor refers to a sensor that includes or is coupled to a processing capacity capable of conducting one or more of processing the detected information or communicating the detected information to a remote processing unit. An awareness scenario is a scenario related to one or more of the operation of the vehicle or the use of the child safety device which a user likes to be aware of. For example, an example awareness scenario includes that an user leaves a parked vehicle with a child still secured in a child safety seat in the vehicle. Another example awareness scenario includes that a backseat door of a vehicle adjacent to a child safety seat is opened when the vehicle is moving.

In an embodiment, a child safety seat may include a motion sensor, e.g., an accelerometer, and a pressure sensor, e.g., an air pressure sensor. The motion sensor is configured to detect a motion state of a vehicle where the child safety seat is installed, e.g., whether the vehicle is moving or non-moving. The pressure sensor is configured to detect a motion state of a door of the vehicle, e.g., a door open/close motion. Based on the information detected by the motion sensor and the pressure sensor, a controller determines whether an awareness scenario occurs. For example, if the motion sensor detects that the vehicle is in a non-moving state and the pressure sensor detects that a door is opened and closed, the controller may determine that a driver leaves the vehicle. If the controller also determines that a child is still in the child safety seat, either through sensing or through human inputs, the controller will generate a control event, e.g., by initiating an alarm, which reminds a user of the awareness scenario, e.g., a child is left in the unattended vehicle.

The controller may be physically integrated with the motion sensor and the pressure sensor on the child safety seat or may reside on a separate smart device and communicate with one or more of the motion sensor or the pressure sensor through wired or wireless communication. To this extent, the controller may be positioned within or adjacent to the vehicle or may be positioned remotely to the vehicle. The alarm may be generated by one or more of a microphone device coupled together with the motion sensor or the pressure sensor on the child safety seat or a microphone device coupled to the controller.

The controller includes an artificial intelligence unit that can be trained to identify a door opening/closing event as differentiated from a window opening/closing event or a roof opening/closing event. The artificial intelligence unit may individualize the determination function of the controller with respect to one or more of individual vehicle or individual drivers of the vehicles. For example, the artificial intelligence unit may be trained to delay an individualized grace period of time between detecting an awareness scenario and activating an alarm. The individualized grace period of time may be trained based on historical date of the driver completing a series of actions of opening driver side door, closing driver side door, walking to the read sear door and opening the rear seat door to release a child from the child safety seat. Other trainings of the controller are also possible and included in the disclosure.

In an embodiment, the controller evaluates the readings of the motion sensor and the pressure sensor based on the sequential order of the readings one or more of before or after a piece of targeted event. For example, the readings before and after a targeted event are evaluated to identify whether the targeted event corresponds to an awareness scenario.

Each of the features and teachings disclosed herein may be utilized separately or in conjunction with other features and disclosure to provide a system and method for determining an awareness scenario by a smart device or smart system. Representative examples utilizing many of these additional features and teachings, both separately and in combination, are described in further detail with reference to the attached FIGS. 1-8. This detailed description is intended to teach a person of skill in the art further details for practicing aspects of the present disclosure, and is not intended to limit the scope of the claims. Therefore, combinations of features disclosed above in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the system and method for achieving context awareness by the smart device or smart system. However, it will be apparent to one skilled in the art that these specific details are not required to practice the teachings of the current disclosure. Also, other methods and systems may also be used.

Figure 1:
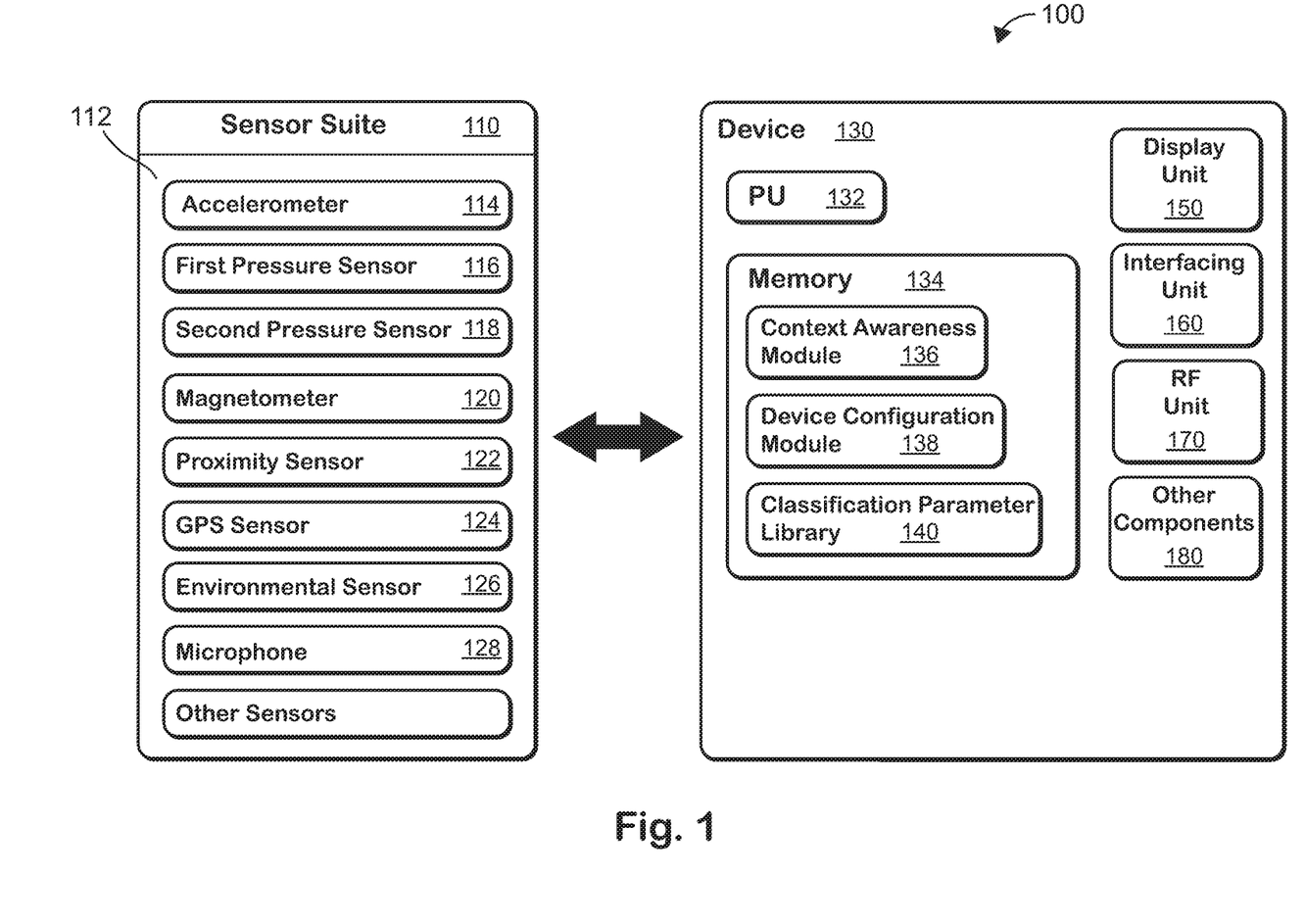
FIG. 1 illustrates example system.

FIG. 1 illustrates an example system 100 for determining an awareness scenario in relation to a child safety device installed in a vehicle.

Referring to FIG. 1, the system 100 includes a sensor suite 110 and a smart device 130. Sensor suite 110 may be integrated onto the smart device 130 and/or may be communicatively and/or electrically coupled to the smart device 130. The sensor suite 110 may include one or more platforms 112 and various sensors contained in or attached onto the platform 112 for detecting various context data. The various sensors may include, but are not limited to one or more motion sensors, shown as an accelerometer 114, a first pressure sensor 116, e.g., an air pressure sensor, a second pressure sensor 118, e.g., a load sensor, a magnetometer 120, a proximity sensor 122, a satellite based positioning sensor (e.g., a GPS sensor) 124, an environmental sensor 126 (e.g., a gas sensor and/or a humidity sensor), a microphone 128 and other sensors. The sensors of the sensor suite 110 may be one or more of coupled or integrated onto the child safety device, coupled to integrated onto the vehicle or coupled to integrated to the smart device 130. The sensors in the sensor suite 110 may be attached to one another or be separate from one another. In an embodiment, one or more sensors in the sensor suite 110 may include or be coupled to an embedded processing unit that is configured to one or more of process the readings of the sensors or to communicate the readings of the sensor to the smart device 130.

For example, the accelerometer 114 and the first pressure sensor 116 may be contained in the platform 112 and attached to the body of the child safety seat 202

The smart device 130 may include a processing unit 132, e.g., a general or special purpose processor or a micro controller (MCU), and a storage device 134, e.g., a memory. The memory 134 may store computer executable instructions which, when executed by the processing unit 132, configure the processing unit 132 to implement a context awareness module 136 and a device configuration module 138. In an embodiment, the device configuration module 138 is an artificial intelligence unit that is operable to learn and train one or more of the context awareness module 136 or the sensor suite 110 based on historical data of context awareness detections and determinations and other data related to the context awareness detections and determinations. The training may be conducted continuously with each context awareness detection data and determination data being used to update the dataset for the training purposes. For example, the memory 134 may store a classification parameter library 140, which is a database of classification parameters for classifying a sensor reading detected by a sensor in the sensor suite 110. The classification parameters may be trained and/or adjusted by the device configuration module 138.

The smart device 130 may also include a display unit 150, an interfacing unit 160, a radio frequency (RF) unit 170 and other components 180. The display unit 150 is configured to display information through a display device, e.g., an active matrix organic light emitting device ("AMOLED"). The interfacing unit 160 is configured to enable a user to interface with the smart device 130 through a user interface device, e.g., a keyboard, a touch screen, or a gesture recognition device. The RF unit 170 is configured to receive or transmit radio frequency signals for the smart device 130 to communicate with other devices, e.g., another smart device 130. The components of the device 130 may reside in a single physical computing device or reside in multiple computing devices that function together in a distributed computing environment to implement the smart device 130.

The smart device 130 may be coupled to or integrated with the sensor suite 110 or may be communicatively linked to the sensor suite 110. Further, in the situation that the functions and components of the smart device 130 are implemented by multiple computing devices 130, the multiple computing devices 130 may be adjacent to the sensor suite 110 or may be distal from the sensor suite 110 or in various combinations of being adjacent to or distal from the sensor suite 110 among the multiple computing devices 130.

Figure 2:
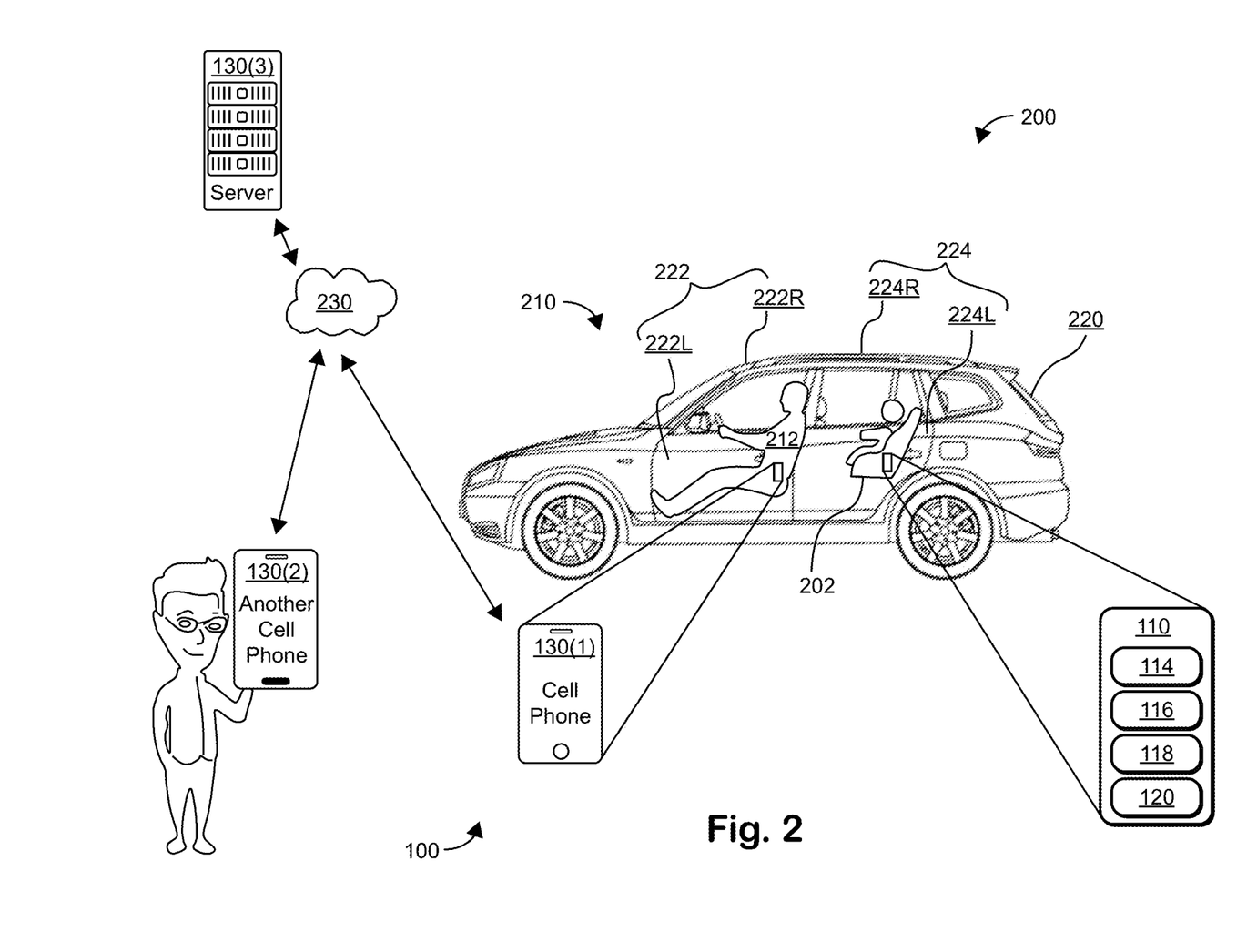
FIG. 2 illustrates an example application scenario of the system of FIG. 1.

FIG. 2 illustrates an operation environment 200 for context awareness analysis. In the operation environment 200, system 100 is coupled to a child safety device 202 within a context 210. The context 210 includes a user 212 and a vehicle 220. The vehicle 220 includes two front seat doors 222 and in some models, backseat doors 224. The front seat doors 222 include a driver side door 222L, shown as the left front door, and a passenger side door 222R. The backseat doors 224 include a left-side backseat door 224L and a right-side backseat door 224R. The child safety device 202, e.g., a child safety seat, is installed in the backseat of the vehicle 220, closer to the backseat doors 224, if any, than to the front seat doors 222. In the disclosure herein, a car is used as an illustrative example of a vehicle 220, which is not limiting. The vehicle 220 may be any type of transportation machine with which a child safety device 202 is used, which are all included in the disclosure.

In an example, the sensor suite 110 includes a motion sensor, e.g., the accelerometer 114, and the first pressure sensor 116, e.g., an air pressure sensor, that are attached to the child safety seat 202. When the motion sensor 114 is fixed to the child safety seat 202 and the child safety seat 202 is installed onto the vehicle 220, the motion sensor 114 can be configured to detect a motion state of the vehicle 220. The first pressure sensor 116 is designed to detect an air pressure change thereabout. Properly positioned on the child safety seat 202 within the vehicle 220, the first pressure sensor 116 can be configured to detect a motion of a vehicle door 222, 224 as the opening or closing the car door causes the air pressure within the vehicle 220 to change. As the front door 222 is more distal to the first pressure sensor 116 than the backseat door 224, the readings of the first pressure sensor 116 may be fine-tuned to differentiate between the front door 222 motion and the backseat door 224 motion.

For example, the accelerometer 114 and the first pressure sensor 116 may be contained in the platform 112 and attached to the child safety seat 202. In another embodiment, the accelerometer 114 and the first pressure sensor 116 may be contained in different platforms 112 and are attached to different parts of one or more of the child safety seat 202 or the vehicle 220. For example, the first pressure 116 may be attached to a door 222, 224 of the vehicle 220.

The sensor suite 110 may also include the second pressure sensor 118 configured as a weight/load sensor and positioned on or below a seat area of the child safety seat 202. The second pressure sensor 118 can be configured to detect whether a load, e.g., a child, is positioned on the seat area of the child safety seat 202. The sensor suite 110 may also include the magnetometer 120 attached adjacent to harness buckles of the child safety seat 202. The magnetometer 120 may be configured to detect whether the harness buckles are engaged or disengaged. The second pressure sensor 118 and/or the magnetometer 120 are configured to detect whether a child is positioned in the child safety seat 202.

The sensor suite 110 may include other sensors that are configured to detect information about the context 210, e.g., the audio/sound information, the location information, or other information about the context 210, which are generally reference to as "context information".

As appreciated, it is the sensors in the sensor suite 110 that actually detect the context of the context 210. The sensor suite 110 may be coupled to a first smart device 130(1) with limited computation capacity to enable a transmittance of the detected context data to a device of higher computation capacity, e.g., a more capable second smart device 130(2) or a server computer 130(3). The data links between the sensor suite 110, first smart devices 130(1), the second smart device 130(2) and the server 130(3) are provided for illustrative purposes, which does not limit the scope of the disclosure.

The devices 130(1), 130(2), 130(3) and the sensor suite 110 may communicate with one another through a communication network 230, e.g., a wireless communication network.

In operation, the smart device 130(1) and the server 130(3) and the respective components thereof may function separately or in combination to achieve context awareness. The sensors of the sensor suite 110 are used to detect context information of the context 210. It should be appreciated that sensors of the sensor suite 110 may reside on or be coupled to different smart devices 130(1), 130(2) which may be communicatively coupled to one another directly through network 230 or indirectly through the server 130(3). The data processing of the context information detected by sensors of the sensor suite 110 may be locally processed by the respective associated smart devices 130(1) or may be centrally processed by the server 130(3). It is also possible that the processing of detected context information may be distributed among multiple smart devices 130(1) and the server 130(3) such that the computation capacity, efficiency and timeliness in the data processing can be optimally balanced. For example, the detected context information may be pre-processed locally on the smart device(s) 130(1) and then processed centrally on the server 130(3). It is also possible that the detected context data is first locally pre-processed at respective smart devices 130(1) and then collected by another one of the smart devices 130(1), e.g., as a local processing hub, to process context awareness by itself or together with the server 130(3). In the description here, the server 130(3) functioning as a cloud-based processing unit working with multiple smart devices 130(1), 130(2) is used as an illustrative example to describe the disclosed techniques. To this extent, the server 130(3) is also referred to as a remote device 130(3) and the smart devices 130(1) are also referred to as local devices 130(1). However, this illustrative example is not meant to limit the scope of the disclosure. Variants to this example are possible and appreciated as within the principles of the disclosure.

The local devices 130(1) may be attached to the child safety seat 202 together with at least part of the sensor suite 110, or may be installed on a mobile device, e.g., a smart phone, that is portable with the user 212, or may be coupled to a portion of the vehicle 220.

Figure 3:
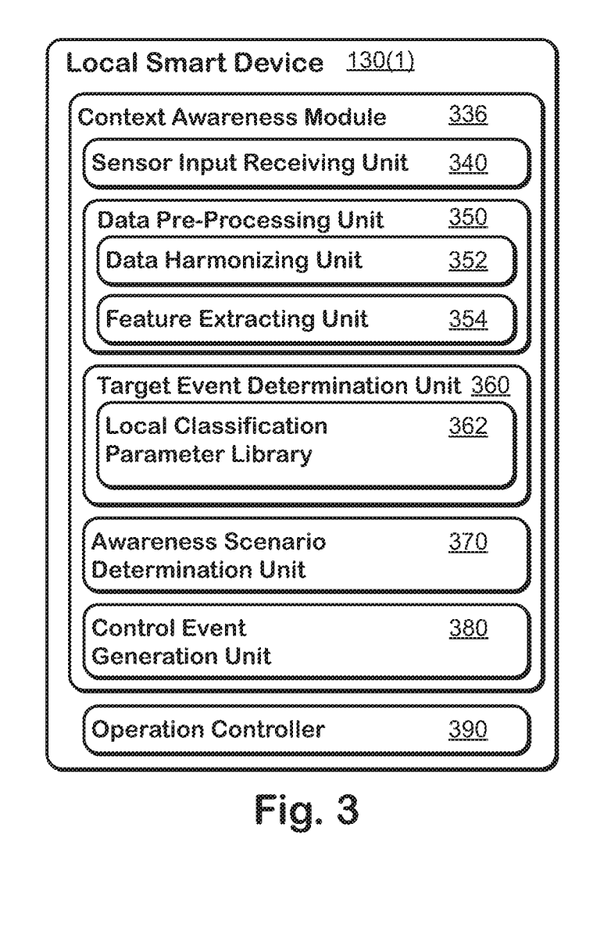
FIG. 3 illustrates an example local smart device of the system of FIG. 1.

FIG. 3 illustrates an example local smart device 130(1) having a context awareness module 336. As shown in FIG. 3, local context awareness module 336 may include a sensor input receiving unit 340, a data pre-processing unit 3202 that includes a data harmonizing unit 352 and a feature extraction unit 354, an target event determination unit it 360 that includes an local classification parameter library 362, an awareness scenario determination unit 370, a control event generation unit 380, and an operation controller 390. The local context awareness module 336 and the components thereof may each be implemented as hardware, software or a combination of hardware and software, which are all included in the disclosure.

In operation, sensor input receiving unit 340 may be configured to receive raw context data detected by sensors of the sensor suite 110. The receiving may be implemented through data bus or through various near-field or long-range data communication networks like blue-tooth, NFC, cellular-based mobile data communication, or other data communication approaches.

Data pre-processing unit 350 may be configured to pre-process the received raw context data to facilitate further processing. In an example, the pre-processing may include filtering the raw context data to remove noise data. The noise filtering may be achieved through hardware noise cancelation circuitry or through digital data processing. Regarding noise cancellation/filtering, the data pre-processing unit 350 may control the setup and/or configuration of the hardware noise cancellation elements to fit the specific noise cancelation specifications. For example, data pre-processing unit 350 may control the raw data to be transmitted through high-pass or low-pass filters depending on specific data collection specifications for context awareness analysis.

Specifically, the data harmonizing unit 352 is configured to harmonize the sensor reading data received from the sensors, e.g., the motion sensor 114 and the first pressure sensor 116. The data harmonization may include adding time stamp information, e.g., applying timestamps, to the raw data detected by the sensors of the sensor suite 110. In an example, the data harmonizing unit 352 applies a same time scale in timestamping the raw sensor data received from the multiple sensors so that those raw data can be combined and/or processed together to enhance the usability of the raw data in detecting awareness scenarios.

The feature extracting unit 354 is configured to generate feature data from the context data detected by the sensors, e.g., the motion sensor 114 or the first pressure sensor 116. The generation of the feature data may include extracting feature data from the raw context data detected by the sensors in the sensor suite 110 or may include generate feature data based on the raw context data. The feature data may be generated corresponding to the classification parameters contained in the local classification parameter library 362. The feature data may be specific to a type of sensor where the context data is detected, a type of context awareness scenario, e.g., motion context or sound context, or a specific type of child safety device 202 that the system 100 is used with.

In an example, the feature extracting unit 354 may process the received context data using a series of time windows, e.g., by applying the time windows to the context data, for the purpose of extracting feature data. The time windows may be variable depending on the type of target events to be detected and/or classified, e.g., the motion state of the vehicle or the motion state of the vehicle door. For example, a larger time window may be applied for the context data on the motion state of the vehicle as compared to that on the motion state of the vehicle door because the door opening or closing events may happen in a much shorter duration of time than the motion state of the vehicle.

In an example, the feature extracting unit 354 separately generates feature data from the context data detected by each of the sensors of the sensor suite 110.

The target event determination unit 360 is configured to determine that a target even occurs based on a reading(s) of one or more sensors, or more specifically the feature data obtained from the readings of the one or more sensor. The target event is defined with respect to an awareness scenario. More specifically, a target event is an event that is related to or constitutes, at least partially, an awareness scenario. For example, a driver leaving a parked vehicle with a child left in the child safety seat is an awareness scenario. A vehicle being still/non-moving after driving and a vehicle door being opened can be defined as target events that are related to the awareness scenario of a driver leaving a child unattended in the child safety seat.

In an example, the target event determination unit 360 analyzes the extracted feature data with the respective classification parameters to determine a target event. To this extent, the classification parameters and the feature data extraction can be individualized for the determination of each type of target events. Raw context data from the sensors may be used to determine more than one type of target events and may be processed to extract different sets of feature data and be analyzed with different classification parameters. The classification parameters may include parameters about a sensor reading at a single time point or may include parameters about a change in the sensor readings about a single time point or within a time duration. For example, the first pressure sensor 116 detects a change of pressure. The parameters for classifying a door opening event may include an absolute amount of pressure change or a rate/percentage of the pressure change. The amount of pressure change or the rate of pressure change are measured or assessed for a set time interval.

The awareness scenario determination unit 370 is configured to determine an awareness scenario based on the determined target events. An awareness scenario may be determined based on a single target event or may be determined based on multiple target events. In some examples, a time sequence between or among the multiple target events are also analyzed in determining an awareness scenario. For example, a first target event may be a motion state of the vehicle 220 changing from moving to non-moving. A second subsequent target event may be a vehicle door 222, 224 is opened. The sequence of the first target event and the second event may be determined to be an awareness scenario that a driver leaves a child unattended in a car.

The control event generation unit 380 is configured to generate a control event, e.g., an alarm, in response to a determined awareness scenario. The control event may be implemented through multiple different means in multiple different formats. For example, an alarm may be implemented through a speaker attached to the child safety seat, through a local smart device 130(1), through the existing alarm system of the vehicle 220, or other suitable alarm generation approaches. In an example, the control event generation unit 380 may apply a grace period between the determined awareness scenario and the generation of the control event. For example, it may take about 5-15 seconds for a user 212 to walk to the backseat door 224 to release a child from the child safety seat 202. The control event generation unit 380 may apply a 15 second delay before generating an alarm after determination an awareness scenario of a person leaving a parked vehicle.

The operation controller 390 controls the operation of the context awareness module 336 into various states. In an embodiment, the various states may include an "Idle" state, a "Pre-arm" state, an "Arm" state, a "Pre-alarm" state or an "Alarm" state. The details of the operation states are described herein in detail.

Figure 4:
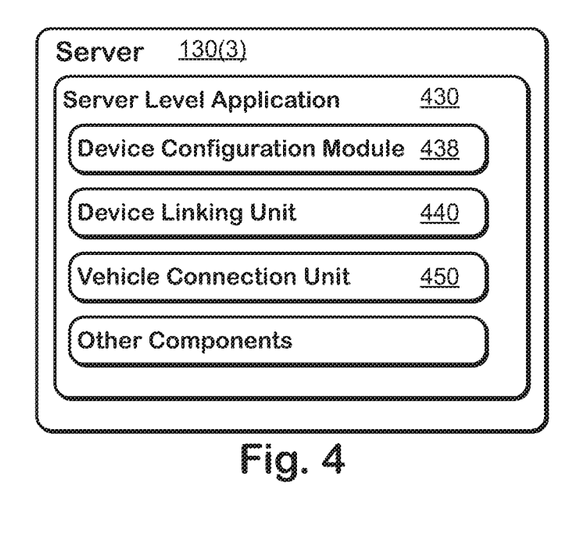
FIG. 4 illustrates an example server of the system of FIG. 1.

FIG. 4 shows an example server 130(3) having a server level application 430. The server level application 430 includes a device configuration module 438, a device linking unit 440, a vehicle connection unit 4202 and other components.

The device configuration module 438 is configured to customize or configure one or more of a local device 130(1) or a sensor in the sensor suite 110. For example, a local classification parameter library 140 of a local smart device 130(1) may be customized. For example, the classification parameters to determine a door opening/closing event may be customized based on the specific type of vehicle 220. For different vehicles 220, the changes in cabin air pressure due to door opening/closing are different. Such differences can be monitored by sensors and collected by the device configuration module 438 in customizing the related classification parameters in the local classification parameter library 140. In another example, different users 212 walk with different speeds from the driver side door 222L to the backseat door to release a child from the child safety seat 202. Such different walking speeds may be collected by the device configuration module 438 and used in customizing a grace period between the awareness scenario determination unit 370 determining an awareness scenario and the control event generation unit 380 implementing a control event. For example, a grace period may provide that the control event generation unit 380 waits for fifteen second to generate an alarm after it is determined that a driver opens a front door 222 of a non-moving vehicle 220, e.g., an awareness scenario of the user leaving a child secured in the child safety seat 202 in an unattended vehicle 220.

In an embodiment, the device configuration module 438 includes an artificial intelligence unit, e.g., a neural network unit, which implements the device configuration tasks without inputs from the user 212 or other human. The neural network unit collects the context data detected by the various sensors of the sensor suite 110 or other data in relation to the vehicle 220 or the user 212 of the vehicle 220 or the system 100. The neural network unit then configures the system 100, e.g., the suite 110 and/or the local smart device 130(1), based on the collected data. The collected data may be real time data or historical data and may be continuously updated, which in turn causes continuous update of the configuration of the system 100.

The device linking unit 440 is configured to link multiple local device 130(1) in relation to a determined awareness scenario. In an embodiment, the multiple local devices 130(1) may be able to implement a control event either simultaneously or sequentially triggered by a same awareness scenario. For example, the local smart device 130(1) that is associated with the user 212 of the vehicle 220 at the time of the awareness scenario may firstly implement the control event, e.g., an alarm. If the awareness scenario is not removed within a threshold period of time, e.g., 10 seconds, an alarm will be generated through another remote local device 130(2) such that another user 212 may be able to intervene and take actions to remove the awareness scenario. In another embodiment, the computing resources of the multiple local devices 130(1), 130(2) are linked together through the device linking unit 440 such that the computation resources of the multiple local devices 130(1) are shared and allocated thereamong by the device linking unit 440. For example, an application layer virtual machine may be established over the multiple local devices 130(1) to implement the context awareness module 136/336. Other ways to link multiple local devices 130(1) in the implementation of the functions of the context awareness module 136/336 are also possible and included in the disclosure.

The vehicle connection unit 450 is configured to share the data and data processing results of the system 100, including the sensor suite 110, the local devices 130(1) and the server 130(3), with other modules or applications of a connected car system installed in the vehicle 220. For example, an on-board diagnostic port ("OBD 2") compatible connected car device may be adapted to exchange data with the vehicle connection unit 450 through Android or iOS based smart device 130(1), 130(2). The sharing is mutual. That is, the system 100 may obtain data and data processing results from the connected car system in the functioning of the system 100 and the system 100 may also provide data and data process results of the system 100 to the connected car system. As appreciated, the system 100 is separate from the vehicle 220. The connected car systems installed in vehicles 220 may be different, e.g., involving different types of data and in different data formats. The vehicle connection unit 450 may function to interface between the different connected car system and the rest of the system 100 to effectuate the information sharing. For example, the engine control information of the vehicle 220 may be obtained through the vehicle connection unit 450 from the engine control unit ("ECU"), which can be used with the accelerometer 114 readings to determine a motion state of the vehicle 220. The vehicle connection unit 450 is configured to facilitate the data exchange between the system 100 and the connection car systems. For example, the vehicle connection unit 450 provides protocols for the data exchange between the system 100 and the various connected car systems.

Figure 5:
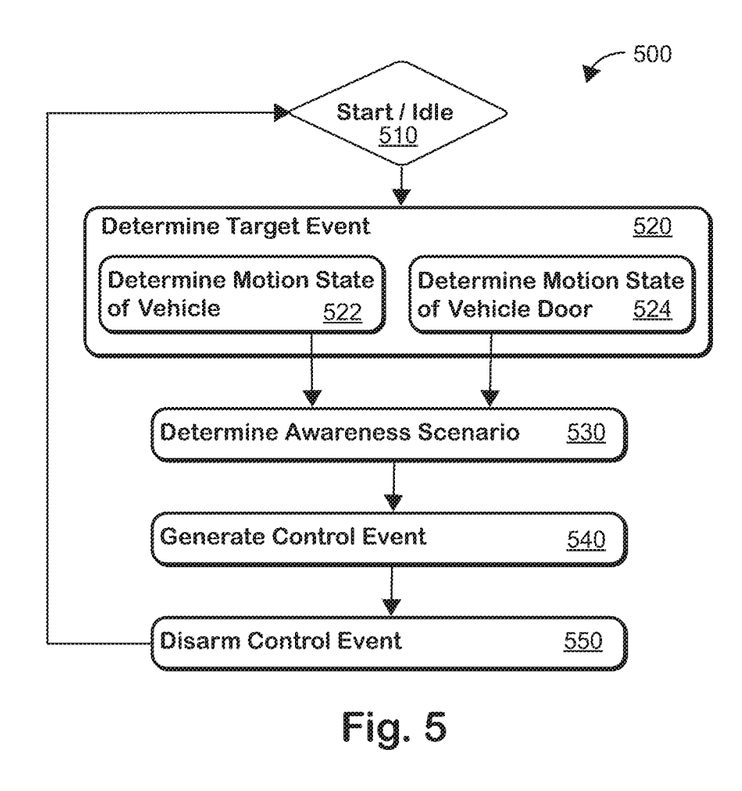
FIG. 5 illustrates an example operation process.
Figure 6:
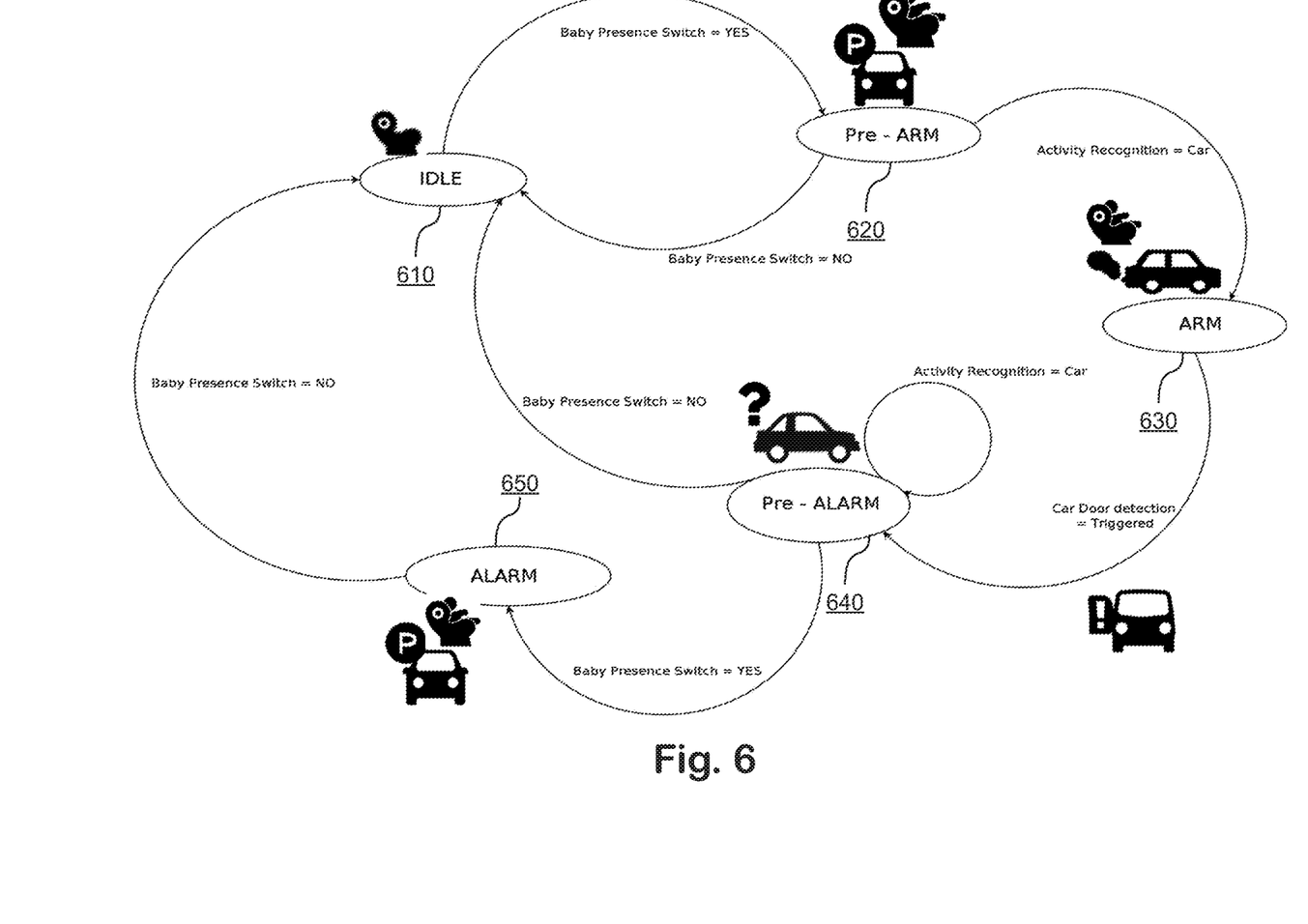
FIG. 6 illustrates an example application scenario of the operation process of FIG. 5.

FIG. 5 illustrates an example operation process 500. FIG. 6 shows an example application scenario where the operation process 500 is applied. Referring to FIGS. 5 and 6 together, in example operation 510, target event determination unit 360 determines whether a system triggering event exists. In the example application scenario of FIG. 6, a system triggering event is a child being positioned within the child safety seat 202 installed in the vehicle 220. The system triggering event may be determined based on an input of the user 212t, e.g., by switching on a child presence switch, or based on a sensor reading. For example, the second pressure sensor 118 of the sensor suite 110 may detect that a load is positioned on the seat area of the child safety seat 202, which indicates that a child is positioned in the child safety seat 202. Further, the magnetometer 120 may detect that the buckles of the child safety seat 202 are engaged, which indicates or infers that a child is secured in the child safety seat 202.

If a system triggering event is determined, the operation controller 390 switches the operation state of the system 100 from the "Idle" state 610 to the "Pre-arm" state 620. In the "Pre-arm" state, the operation of the system 100, including the sensor suite 110, the smart device 130 including the local devices 130(1), 130(2) and the server 130(3) are all activated. The linkage between the multiple local devices 130(1), 130(2) are established and the computation resources of the devices 130 are allocated to the context awareness module 336 and the server level application 430, respectively. For example, the operation of the context awareness module 336 may be switched from an energy-saving background operation mode to a performance-oriented foreground operation mode.

In example operation 520, the target event determination unit 360 determines a target event. The target event is an identified event in the context 210 that is a target for further analysis. The target event is determined based on the context information detected by the sensors in the sensor suite 110. For example, a motion state of the vehicle 220 is a target event. The motion state of the vehicle door 222, 224 is also a target event. In some examples, the context information are detected by the sensors and analyzed by the target event determination unit 360 simultaneously for all the target events. In some other examples, the target events are grouped into subsets or tiers. The sensors detect context information and the target event determination unit 360 analyzes the detected context information for some subsets or tiers of target events in the "Pre-arm" state 620 as controlled by the operation controller 390.

For example, as shown in FIG. 6, in the "Pre-arm" state, the motion state of the vehicle 220 is firstly detected while the motion state of the vehicle door 222, 224 is not detected. When it is determined that the vehicle 220 is in a moving state, the operation controller 390 controls the operation of the system 100 to enter the "Arm" state 630. In the "Arm" state 630, the motion state of the vehicle door 222, 224 is also detected, together with the motion state of the vehicle 220.

In an embodiment, the target event determination unit 360 analyzes the received context data with the classification parameters stored in the local classification parameter library 362 in determining a target event. A classification parameter may be any property related to a reading of a sensor in the sensor suite 110 that are used to classify whether the reading of the sensor indicating a target event. For example, for the readings of the accelerometer 114, a magnitude of the acceleration or speed readings may indicate a speed or speed change of the vehicle 220. The classification parameter for the accelerometer 114 readings may be a threshold magnitude. For another example, the air pressure sensor 116 is configured to detect air pressure change. Opening or closing a vehicle door 222/224 will cause vehicle 220 cabin air pressure change in opposite directions, e.g., decreasing versus increasing. The magnitude of a reading of the air pressure sensor 116 may be compared to a threshold magnitude to classify, together with the polarity of the air pressure sensor reading, whether a door opening or closing event occurs.

The cabin of the vehicle 220 is not air tight such that the change of air pressure will last for only a short time interval. To correctly capture the air pressure change, the feature extracting unit 354 pre-processes the readings of the air pressure sensor 116 by applying a time window to each piece of feature data extracted from the readings of the air pressure sensor 116.

In an embodiment, the classification parameters and the time windows are configurable or customizable by the device configuration module 438 using neural network-based artificial intelligence.

In an embodiment, the readings of the accelerometer 114 and the air pressure sensor 116 are pre-processed by the data harmonizing unit 352 such that the two types of data can be used together by the target event determination unit 360. For example, the data harmonizing unit 350 applies a same time scale into the readings of the accelerometer 114 and the readings of the air pressure sensor 116.

Figure 7:
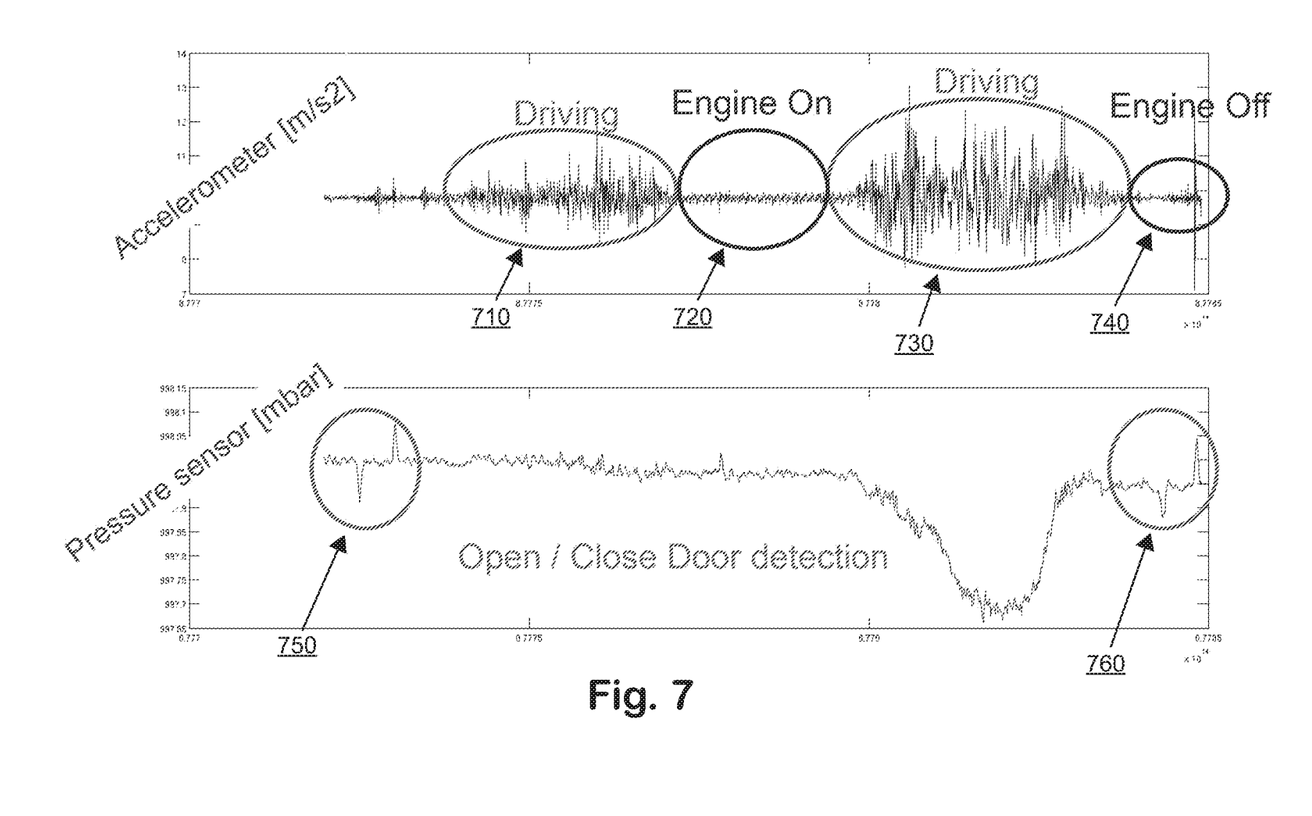
FIG. 7 illustrates example accelerometer and air pressure sensor readings.

FIG. 7 shows example reading of the accelerometer 114 readings and example readings of the air pressure sensor 116 in a same time scale. As shown in FIG. 7, by analyzing the readings of the accelerometer 114 with the respective classification parameters, the target event determination unit 360 determines a "driving" event 710, an "engine on" event 720, a "driving" event 730 and an "engine off" event 740 in a time sequence. By analyzing the readings of the air pressure sensor 116 with the respective classification parameters, the target event determination unit 360 determines a "vehicle door open/close" event 750 and a "vehicle door open/close" event 760. The "vehicle door open/close" event 750 occurs before the vehicle "driving" event 710. The "vehicle door open/close" event 760 overlaps in time with the vehicle "engine off" event 740.

Figure 8:
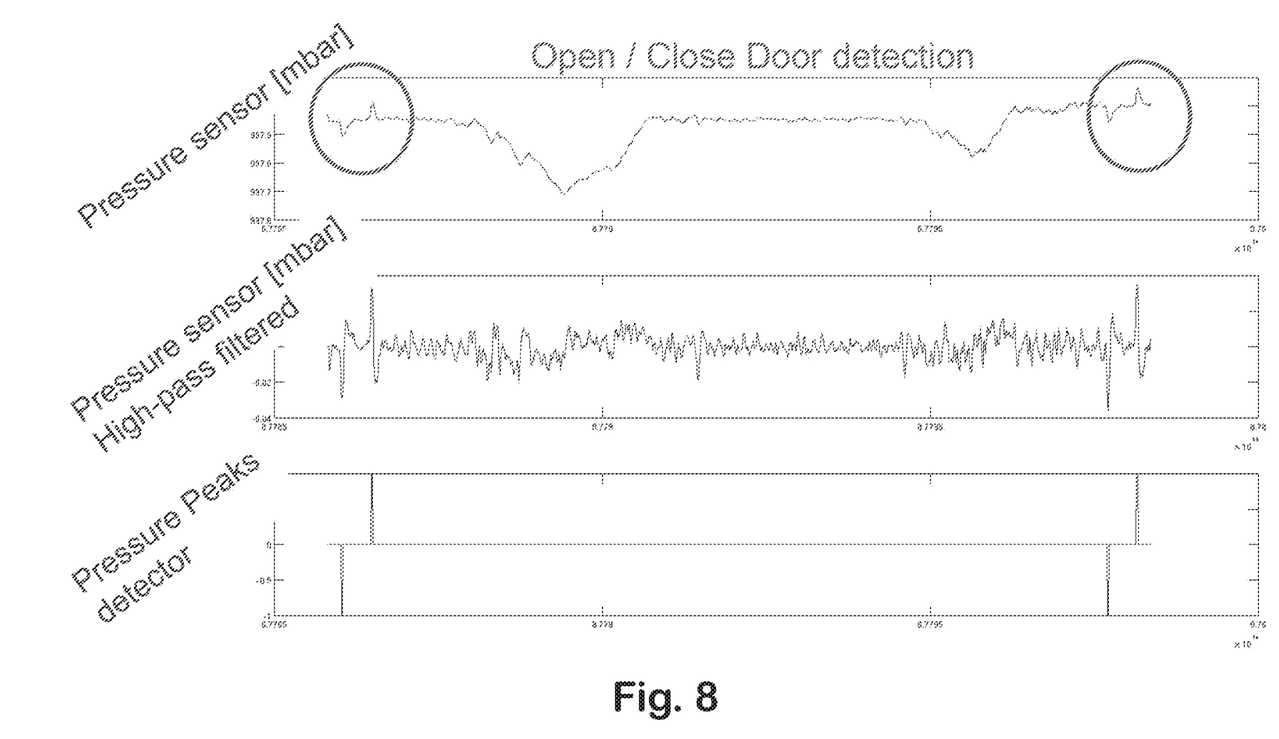
FIG. 8 illustrates an example data processing of a sequence of air pressure sensor readings.

FIG. 8 shows an example feature data extracting operation result of the feature extracting unit 354 processing the air pressure readings from the air pressure sensor 116. As shown in FIG. 8, a high-pass-filtering operation is applied by the feature extracting unit 354 to obtain the pressure change peak features from the air pressure readings. The pressure change peak feature data is analyzed by the target event determination unit 360 with the respective classification parameters to determine the door open/close events. In an example, the high-pass filter is implemented through digital data filtering and the device configuration module 438 configures the parameters of the digital data filtering of the feature extracting unit 354 of one of the local devices 130(1), 130(2) using neural network based artificial intelligence.

In FIGS. 7 and 8, the target events of "vehicle door open/close" are determined without differentiation between front door 222 and backseat door 224, as an illustrative example. In other example, the classification parameters may be configured to differentiate between the air pressure changes related to the open/close motions of the front door 222 and the open/close motions of the backseat door 224. As the front door 222 is further away from the air pressure sensor 116 than the backseat door 224, the air pressure sensor 116 will sense a smaller air pressure change for the open/close motion of the front door 222 than for the backseat door 224.

Referring back to FIGS. 5 and 6, in example operation 530, the awareness scenario determination unit 370 determines that an awareness scenario occurs in the context 210 based on the target events determined by the target event determination unit 360. The awareness scenarios may be preset for the system 100 by one or more of system setup, the device configuration module 138/438, or user inputs. The awareness scenarios may also be dynamically set up for the system 100 by the device configuration module 138/438 using artificial intelligence. For example, the device configuration module 138/438 may predict a response of the user 212 to identified target events based on historical data and may set up or update awareness scenarios based on the predicted user responses.

The correlations between an awareness scenario and one or more target events may be preset or may be dynamically determined. In an embodiment, the time sequence between or among multiple target events are also considered by the awareness scenario determination unit 370 in determining an awareness scenario.

For example, an awareness scenario includes that a user 212 leaves a child secured in the child safety seat 202 in the unattended vehicle 220. As shown in the example context 210 information of FIG. 7, the "vehicle door open/close" event 760 is detected as overlapping in time sequence or subsequence to the "engine off" event 740. Further, the "engine off" event 740 follows the vehicle 220 "driving" event 730. The awareness scenario determination unit 370 determines based on the "driving" event 730, the "engine off" event 740 and the "vehicle door open/close" event 760 that the user 212 may have stopped the vehicle 220 and left the vehicle 220, which indicates that the awareness scenario of the user 212 leaving a child secured in the child safety seat 202 in the unattended vehicle 220 occurs.

For another example, an awareness scenario includes that a child opens one of the vehicle doors 224 while the vehicle 220 is moving. If a "vehicle door open" event is determined as overlapping in time sequence with a vehicle "driving" event, the awareness scenario determination unit 370 determines that an awareness scenario occurs that a child opens a vehicle door while the vehicle is moving.

Other awareness scenarios are also possible and included in the disclosure.

When an awareness scenario is determined, the operation controller 390 switches the operation state of the context awareness module 336 from the "Arm" state 630 to the "Pre-alarm" state 640.

In the "Pre-arm" state 640, the control event generation unit 380 starts counting down a "grace period" for a "Disarm" event to remove the awareness scenario. A "Disarm" event is an event that removes the awareness scenario. For example, when a child is removed from the child safety seat 202, the awareness scenario of the user 212 leaving a child unattended in the vehicle 220 is removed. The "Disarm" event may be detected by the sensors of the sensor suite 110 and determined by the target event determination unit 360 or may be established through an input of the user 212. For example, the user 212 may switch off a baby presence switch associated with the system 100 to establish that a child has been removed from the child safety seat 202. The second pressure sensor 118 or the magnetometer 120 may also detect that a load has been removed from the seat area of the child safety seat 202 or that the buckles of the child safety seat 202 have been disengaged, respectively. Those sensor readings may be used to determine that a "Disarm" event occurs.

If a "Disarm" event occurs within the "grace period", the operation controller 390 switches the operation state of the context awareness module 336 to the "Idle" state 610. The "grace period" may be specifically set up for one or more of the specific system 100, the specific local device 130(1), the specific user 212, the specific vehicle 220, the specific child safety device 202 or other individualized parameters of the context 210 by the device configuration module 138/438. For example, for the awareness scenario of the user 212 leaving a child unattended in the vehicle 220, the grace period may be determined based on how long it takes the specific user 212 to walk from the front door 222 of the specific vehicle 220 to the backseat door 224 of the vehicle 220 adjacent to the child safety seat 202.

If no "Disarm" event occurs within the "grace period", the operation controller 390 switches the operation state of the system 100 to the "Alarm" state 650. Under the "Alarm" state 650, in example operation 540, the control event generation unit 380 issues a control event, e.g., an alarm, to notify the user 212 of the system 100 that the awareness scenario happens. The control event may be issued through the local device 130(1) that is adjacent to one or more of the vehicle 220 or the user 212 of the vehicle 220. The control event may also be issued through other local devices 130(2) that are linked together with respect to the system 100 through the device linking unit 440. The control event may also be issued through the vehicle alarm system that is separate from the system 100, through the vehicle connection unit 450.

In example operation 550, when a "Disarm" event is detected, e.g., the user 212 switches the baby presence switch to a "No" state, the operation controller 390 switches the operation state of the system 100 to the "Idle" state 610.

Processors, as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device has one or more memories, and each memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk drive, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

What is claimed is:

1. A system, comprising:
   a first sensor included in a child safety seat and configured to detect that a transportation machine changes a motion status from moving to non-moving, after the system is installed in the transportation machine;
   a second sensor included in the child safety seat and configured to detect whether a driver side door of the transportation machine is opened after it is determined by the first sensor that the transportation machine changes the motion status from moving to non-moving and whether a backseat door of the transportation machine is opened within a threshold time after the driver side door is opened; and
   a control unit communicatively coupled to the first sensor and the second sensor and, when in operation, the control unit generating a control event in response to the first sensor detecting that the transportation machine changes the motion status from moving to non-moving, and the second sensor detects that the driver side door of the transportation machine is opened after the transportation machine changes the motion status from moving to non-moving and the backseat door is not opened within the threshold time after the driver side door is opened.

2. The system of claim 1, wherein the first sensor is a micro-electro-mechanical system accelerometer coupled to the child safety seat installed in the transportation machine.

3. The system of claim 1, wherein the first sensor is a part of a portable integrated circuit.

4. The system of claim 1, wherein the second sensor is an air pressure sensor.

5. The system of claim 1, wherein the control unit is configured to differentiate between a first reading of the second sensor indicating a position of a first door of the transportation machine and a second reading of the second sensor indicating a position of a second door of the transportation machine, the first door being closer to the second sensor than the second door.

6. The system of claim 1, wherein the control unit generates the control event at least partially in response to a reading of the first sensor indicating that the transportation machine is in the non-moving state immediately subsequent to a moving state.

7. The system of claim 1, wherein the second sensor is configured to differentiate between detecting a position of a backseat door and detecting a position of a driver-side front door.

8. The system of claim 1, wherein the control unit generates a different control event in response to a reading of the first sensor indicating that the transportation machine is in a moving state and a reading of the second sensor indicating that the backseat door is open.

9. The system of claim 1, wherein the control unit is configured to be activated by a trigger event.

10. The system of claim 9, wherein the trigger event is one or more of a user input or a sensing event with respect to the child safety seat coupled to the transportation machine.

11. The system of claim 1, further comprising a third sensor configured to be coupled to the child safety seat and configured to detect that the child safety seat is in use.

12. The system of claim 11, wherein the third sensor is a pressure sensor configured to detect that a subject is positioned in the child safety seat.

13. The system of claim 11, wherein the third sensor is configured to detect that a latch of the child safety seat is engaged.

14. A module, comprising:
- a platform included in a child safety seat installed on a vehicle;
- a first motion sensor on the platform and configured to detect that a motion state of the vehicle changes from a moving state to a non-moving state;
- a second sensor on the platform and configured to detect a motion state of a driver side door of the vehicle and a motion state of a backseat door of the vehicle; and
- a data interface unit coupled to receive at least one of a first reading of the first motion sensor or a second reading of the second sensor and to generate an event in response to the first motion sensor detecting that the motion state of the vehicle changes from moving to non-moving, and the second sensor detecting that the driver side door of the vehicle is opened after the vehicle changes the motion state from moving to non-moving and the backseat door is not opened within a threshold time after the driver side door is opened.

15. The module of claim 14, wherein the data interface unit is further configured to send the received at least one of the first reading or the second reading to a processing unit.

16. A method, comprising:
- detecting, by a first sensor positioned in a child safety seat installed in a vehicle, that a motion state of the vehicle changes from a moving state to a non-moving state;
- detecting a motion state of a driver side door of the vehicle by a second sensor positioned in the child safety seat and a motion state of a backseat door of the vehicle;
- receiving from the first sensor a vehicle motion state signal indicating the motion state of the vehicle;
- receiving from the second sensor a door motion state signal indicating the motion state of the door; and
- implementing an action event in response to the first sensor detecting that the vehicle changes the motion state from moving to non-moving, and the second sensor detects that the driver side door of the vehicle is opened after the vehicle changes the motion state from moving to non-moving and the backseat door is not opened within a threshold time after the driver side door is opened.

17. The method of claim 16, wherein the first sensor is a micro-electro-mechanical system accelerometer attached to the child safety seat installed in the vehicle.

18. The method of claim 16, wherein the second sensor is a micro-electro-mechanical system air pressure sensor attached to the child safety seat installed in the vehicle.

19. The method of claim 16, wherein the action event is an alarm.

\* \* \* \* \*